Nov. 12, 1935.         P. KLAMP         2,020,320

COMBINED WORK FEEDING AND HOLDING DEVICE

Filed June 9, 1934

INVENTOR:
Paul Klamp
by  his ATTORNEYS

Patented Nov. 12, 1935

2,020,320

UNITED STATES PATENT OFFICE 2,020,320

COMBINED WORK FEEDING AND HOLDING DEVICE

Paul Klamp, Canton, Ohio, assignor to The Timken Roller Bearing Company, Canton, Ohio, a corporation of Ohio Application June 9, 1934, Serial No. 729,739

6 Claims. (Cl. 29—62)

This invention relates to devices for feeding and holding in an automatic lathe stock of sufficient length to form more than one completed article, particularly stock of the kind disclosed in my copending application Serial No. 728,690 filed June 2, 1934 comprising a connected series of preformed units or blanks of approximately the size and profile of the articles produced by said lathe.

The invention has for its principal objects to devise a simple, economical and compact device that will accurately feed and securely hold such stock in the work spindle of the lathe, that will provide for the engagement of the feeding member with the stock at a point close to the stock holding chuck and that will facilitate insertion of new stock in said device. The invention consists in the combined stock feeding and holding device and in the construction, combinations and arrangements hereinafter described and claimed.

Figure 1:
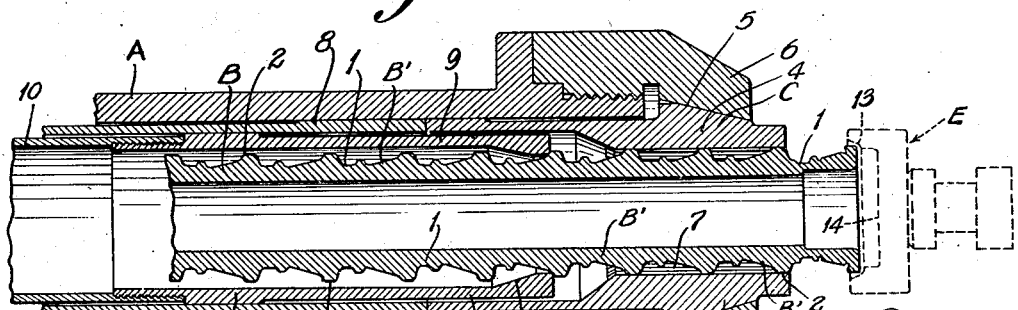
Figure 6:
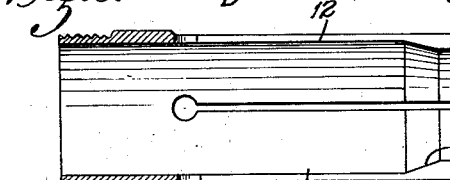
Figure 5:
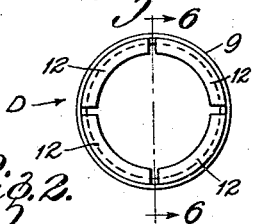
Figure 2:
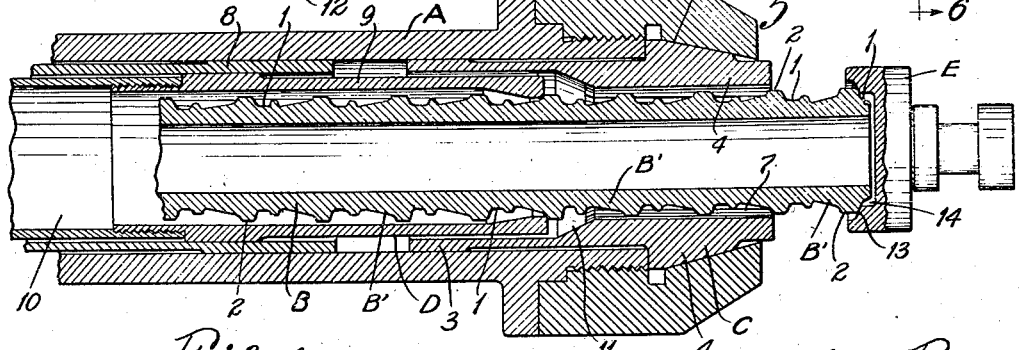
Figure 4:
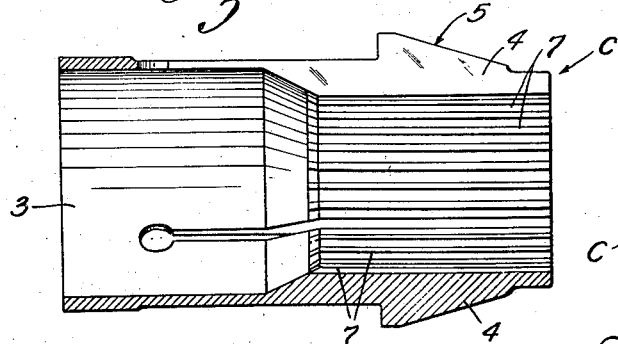
Figure 3:
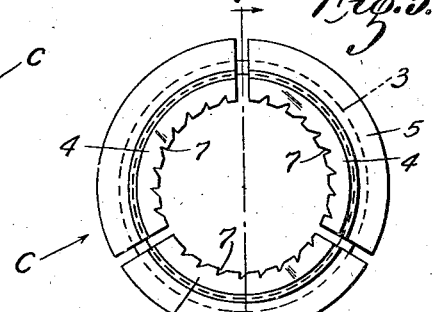

In the accompanying drawing, which forms part of this specification and wherein like symbols refer to like parts wherever they occur, Fig. 1 is a longitudinal section through a portion of the work spindle of an automatic lathe equipped with a stock feeding and holding device embodying my invention, the endmost profile blank being shown finish machined and ready to be cut off, the chucking collet being shown in closed position, and the stock pusher being shown at the end of its feeding movement, Fig. 2 is a view similar to Fig. 1 with the stock pusher also shown at the end of its feeding movement, but with the chucking collet shown in open position and about to be moved to the right and to be closed in on the profile stock, Fig. 3 is a front end view of the stock holding chuck, Fig. 4 is a central longitudinal section on the line 4—4 of Fig. 3, Fig. 5 is a front end view of the stop pusher; and Fig. 6 is a central longitudinal section on the line 6—6 in Fig. 5.

The accompanying drawing illustrates the rotary work spindle A of an automatic lathe equipped with a device embodying my invention for feeding through and holding in said spindle an elongated tube of stock B so that its forward end portion can be operated upon by various working tools (not shown) of said lathe.

The tube of stock B, which forms the subject matter of my copending application, is continuously rolled into a connected series of separable preformed units or blanks B' of approximately the size and profile of a common type of roller bearing cone. The blanks are spaced apart by necks or connecting portions 1 which hold the blanks on the stock until they are finished and are afterwards removed to sever the finished cone from the stock. As shown in the drawing, each blank is provided with a circumferential rib 2 adapted to form the thrust rib at the large end of the finished roller bearing cone or inner bearing member. These circumferential ribs are spaced apart equal distances along the tube of stock and are adapted to be engaged by the stock pusher member hereinafter described.

In accordance with common practice the work spindle A, of which only the forward end portion is shown, is rotated by gearing (not shown) in a lathe head (not shown). Mounted in the hollow work spindle for longitudinal movement therein is a stock holding chuck or collet C which projects beyond the forward end of said spindle. Said collet comprises a cylindrical sleeve 3 whose rear portion is of larger bore than the front portion, which is slotted endwise to form resilient stock gripping arms 4 and has its outer surfaces tapered, as at 5, for cooperation with the conical bore of a cap 6, which is threaded on the forward end of said spindle. The bore of the collet arms is preferably provided with longitudinal stock gripping teeth 7 and, in the unsprung condition of said arms, is of slightly larger diameter than the ribs 2 of the stock. The spring chuck or collet is slid forward to bring the conical portion 5 thereof into engagement with the conical bore of the spindle cap 6 and thus force the resilient arms of the collet into gripping engagement with the annular ribs 2 of the stock by means of a collet tube 8 that is reciprocated in the spindle in any suitable manner (not shown).

A step by step longitudinal forward movement is imparted to the stock B by means of a stock pusher D comprising a cylindrical sleeve 9 whose rear end is threaded into the forward end of the usual stock pusher or feed tube 10, which is reciprocated longitudinally in the collet tube 8 by a suitable mechanism (not shown) located at the rear end of the spindle. The stock pusher tube 10 and the rear portion of the stock pusher sleeve 9 are of larger bore than the bore in the front end of said sleeve, the two bores of said sleeve being connected by a conical bore 11. The endmost portions of said arms are thus inturned and of the shape of pawls whose inclined portions permit them to ride idly over obstructions in one direction while the blunt ends bear operatively against obstructions in the opposite direction. The forward end portion of the stock pusher sleeve 9 has a loose fit in the large rear bore of the collet C and is slotted endwise to form resilient feed arms 12 that are movable radially in the bore of collet C. In their unsprung condition, the free end portions of these arms form a bore that is smaller than the bore of the collet arms 4 when gripping the stock. With this arrangement, when the feed arms 12 move rearwardly with the stock pusher tube relative to the stock, the conical bore 11 of said arms rides over the rib 2 located rearwardly thereof and forces the feed arms outwardly to form a bore large enough to clear said rib. When the ends of the arms have moved clear of the rear edge of the rib, they return to their unsprung condition back of said rib where they are in position to push against said rib and thus feed the stock forward through the bore of the spring collet arms 4. The mechanism for actuating the collet tube is synchronized with the mechanism for reciprocating the stock pusher tube so that the stock is gripped by the collet during the rearward travel of the feed arms to feed position and releases the stock during the forward or feeding movement of said feed arms.

A suitable stop E is provided at the forward end of the spindle A for limiting the forward feed of the stock. This stop stock may be mounted in any suitable manner on the lathe so as to rotate with the stock. As shown in the drawing, the stock engaging end of the rotary stock stop is counterbored to form an annular stop shoulder 13 for the endmost rib 2 and a circular recess 14 to accommodate the portion of the neck 1 located forward of said rib. By this arrangement, the stock is not stopped by the foremost portion, which is the portion of a connecting neck 1 remaining after the severance of a unit from the body of the stock; but said stock is stopped by the foremost unfinished rib thereof, thereby keeping the feeding of the stock in step with the spacing of the ribs 2 thereof. The forward motion of the stock pusher D is preferably made flexible so that the stock can be safely stopped by the rotary stop E even when the feed arms of the stock pusher sleeve 9 have a positive grip on the stock. After the feed of the stock is stopped by said stop, the chucking collet C is closed in again on the stock, thereby causing the stock and the feeding and holding mechanism to rotate with the spindle.

The hereinbefore described profile stock holding and feeding device has numerous advantages. It is simple and compact and can be readily incorporated in work spindles without material alteration thereof; it provides a positive feed for the stock, as distinguished from the frictional feeds hereinbefore employed, and thus prevents slipping of the feed and the wasting of material.

Obviously, the hereinbefore described stock holding and feeding device admits of considerable modification without departing from the invention. Therefore, I do not wish to be limited to the precise construction shown and described.

What I claim is:

1. A holding and feeding device for profiled work stock, said device consisting of a spring collet whose rear portion is of larger bore than the front portion, the front portion being slotted endwise to form resilient stock gripping arms and being tapered for cooperation with a conical cap, and means for feeding the work stock, said means consisting of a slidably mounted stock feeding tube extending into the rear portion of said collet and having its front portion slotted to form resilient arms that are movable radially in said collet, the free ends of said feeding tube arms having inturned portions adapted to idly enter a depression in the profiled stock on the back stroke and to operatively engage the side of such depression on the forward stroke so as to feed the stock.

2. A holding and feeding device for profiled work stock, said device consisting of a rotary work spindle having an axial bore tapered at the front portion of said spindle, a spring collet axially slidable in the spindle bore and having its front portion slotted endwise to form resilient stock gripping arms that are tapered for cooperation with the tapered front portion of said spindle bore, a sleeve having its front portion axially slidable in the rear portion of said collet and slotted to form resilient stock feeding arms that are movable radially of said collet, the free ends of said feeding tube arms being turned inwardly and of pawl shape whereby they are adapted to bear against the ribs on said stock and thereby move the stock in one direction and to ride idly over such ribs in the opposite direction, and a rotatably mounted stop located opposite the front end of said spindle for limiting the feed of the stock, said stop being arranged to permit the work to move until a predetermined wide portion of the work strikes said stop.

3. A rotary work spindle for feeding and holding stock provided with a series of longitudinally spaced ribs on its exterior surface, said spindle having an axial bore tapered at the front portion of said spindle, a spring collet axially slidable in said bore and having its front portion provided with resilient stock gripping arms that are tapered for cooperation with the tapered front portion of said spindle bore, and a sleeve axially slidable in the rear portion of said collet and provided with resilient stock feeding arms that are movable radially of said collet, the free ends of said stock feeding arms being turned inwardly and of pawl shape whereby they are adapted to bear against the ribs on said stock and thereby move the stock in one direction and to ride idly over such ribs in the opposite direction.

4. A rotary work spindle for feeding and holding stock provided with a series of longitudinally spaced ribs on its exterior surface, said spindle having an axial bore tapered at the front portion of said spindle, a spring collet axially slidable in said bore and having its front portion provided with resilient stock gripping arms that are tapered for cooperation with the tapered front portion of said spindle bore, and a sleeve axially slidable in the rear portion of said collet and provided with resilient stock feeding arms that are movable radially of said collet, the free ends of said stock feeding arms having inturned pawl portions which are adapted to enter the open spaces of the profile and are so arranged as to abut against the ribs and thereby move the stock on the feeding movement and to slide idly over the profile on the return movement.

5. A spindle having means for feeding and means for holding profile stock to be acted on by tools, said feeding means making operative engagement with the rear face of a wide portion of the profiled stock and a stop for limiting the feeding movement of said stock, said stop being operatively positioned in alinement with the peripheral portion only of a wide portion of the stock.

6. A spindle having means for holding and means for feeding to work tools elongated stock in the form of an integral chain of profiled blanks spaced apart by connecting necks, and a stop for limiting the feeding movement of said stock, said stop being positioned to contact with the peripheral portion only of a wide portion of a blank.

PAUL KLAMP.